Jan. 25, 1949.   W. F. KANNENBERG   2,460,090
FREQUENCY SELECTIVE APPARATUS
Filed Nov. 26, 1945   2 Sheets-Sheet 1
FIG. I.
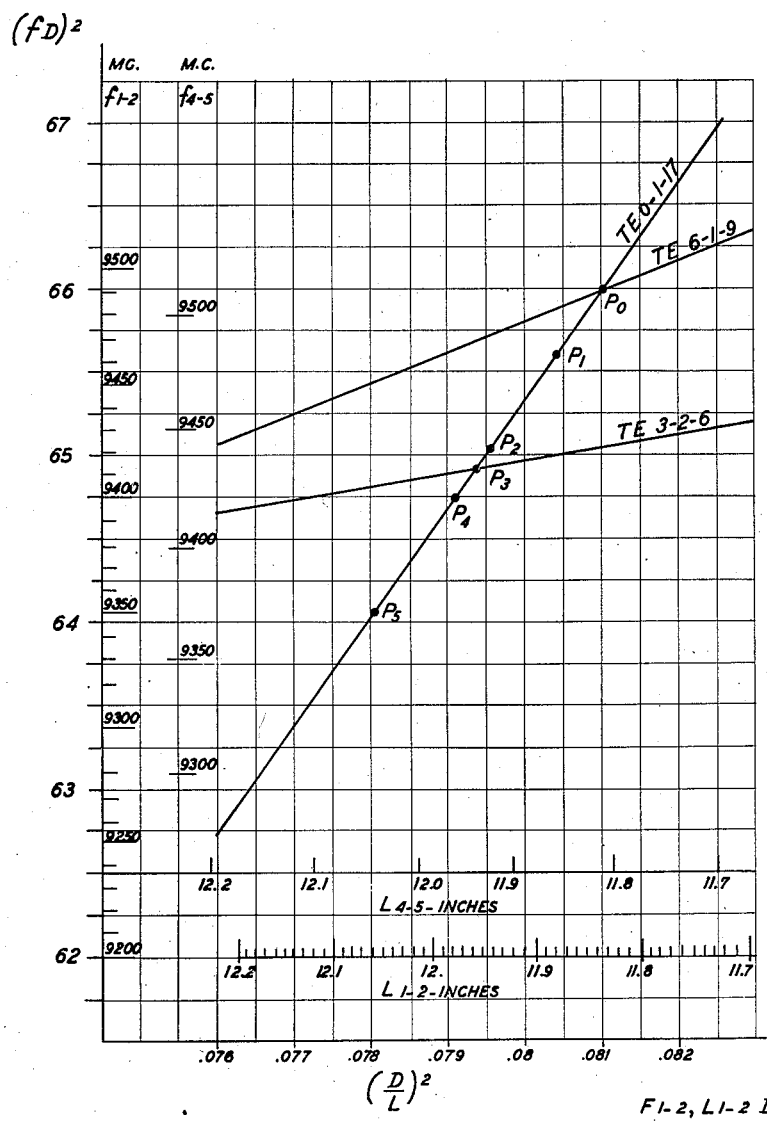
F1-2, L1-2 D = 3.37"
F4-5, L4-5 D = 3.363"
INVENTOR
W. F. KANNENBERG
BY
E. V. Griggs
ATTORNEY Jan. 25, 1949. W. F. KANNENBERG 2,460,090
FREQUENCY SELECTIVE APPARATUS
Filed Nov. 26, 1945 2 Sheets-Sheet 2
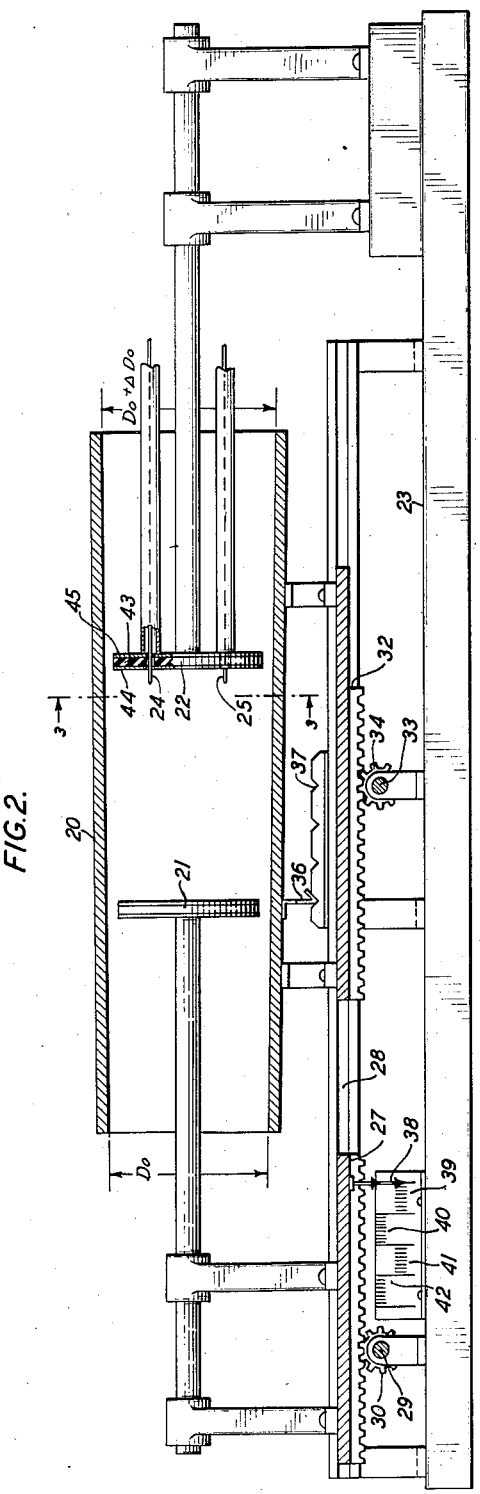
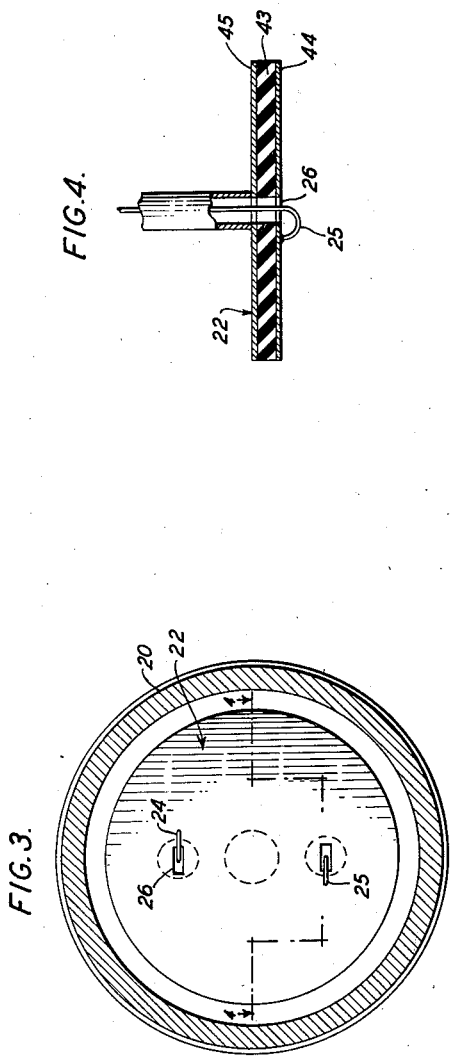
INVENTOR
W. F. KANNENBERG
BY
E. V. Griggs
ATTORNEY

UNITED STATES PATENT OFFICE 2,460,090

FREQUENCY SELECTIVE APPARATUS

Walter F. Kannenberg, Lyndhurst, N. J., assignor to Bell Telephone Laboratories, Incorporated, New York, N. Y., a corporation of New York Application November 26, 1945, Serial No. 630,927

3 Claims. (Cl. 178—44)

This invention relates to frequency selective apparatus and more particularly to tunable cavity resonators.

An object of the invention is to enable increasing the effective band over which a cavity resonator may be tuned without encountering troublesome oscillations of extraneous modes.

An additional object of the invention is to enable the effective diameter of a cavity resonator to be readily varied in different frequency ranges of its operation.

As is well known a cavity resonator may have a large number of natural resonances depending upon the configuration of the boundary surfaces of the resonator and upon the resonator dimensions. If it is desired to utilize the resonator as a tunable selector of electrical oscillations the band over which tuning may be effected for a desired mode of oscillation free from interference with oscillations of an extraneous mode may be seriously restricted. It is possible to inhibit or suppress such interfering or extraneous modes of oscillations by various expedients which take advantage of an attenuation selective in its nature so as to discriminate strongly against oscillations of the unwanted mode without presenting too serious attenuation to the desired oscillations. However, if the unwanted oscillations and the desired oscillations are of the same general family as may be the case when both are transverse electric modes, it is ordinarily considerably more difficult to effect such a selective discrimination.

A particularly useful expedient applicable in designing cavity resonators of cylindrical type for various modes of oscillation is a straight line graph which portrays the relationship between resonance frequency, diameter, and length of the resonator for a particular mode of interest. A chart including the graphs of the various modes of oscillations which may fall within a given frequency band may be utilized to secure results which it is otherwise quite difficult to attain. The derivation of the graphs of such a chart may begin with the resonance formula for a perfect cylinder.

$$(fD)^2 = \frac{(cr)^2}{\pi} + \frac{(cn)^2}{2}\left[\frac{D}{L}\right]^2 \quad (1)$$

Where $f$ is the frequency in cycles per second, $D$ is the diameter of the cylinder in centimeters; $L$ is the length of the cylinder in centimeters; $r$ is the Bessel function root for the selected mode of oscillations; $c$ is the electromagnetic velocity constant $2.998 \times 10^{10}$ centimeters per second, and $n$ is the subscript of the oscillation mode which denotes the number of half wavelengths in the direction of the longitudinal axis of the cylinder. Equation 1 may be rewritten as $$(fD)^2 = A + Bn^2\left[\frac{D}{L}\right]^2 \quad (2)$$

which, for a preselected $n$, yields:

$$(fD)^2 = A + K\left[\frac{D}{L}\right]^2 \quad (3)$$

A and K being constants. As is evident this is the equation of a straight line relating $(fD)^2$ to $$\left[\frac{D}{L}\right]^2$$

Each oscillation mode of a perfect cylindrical resonator may be plotted as a straight line and the possibilities for encountering interference and for avoiding that interference may then be readily ascertained.

In accordance with the invention a cavity resonator of generally cylindrical conformation is so designed that it is capable of having the ratio of its diameter to its length changed at will. The resonator may then be tuned in the usual manner as, for example, by moving an end plate until an intermediate frequency is reached adjacent the frequency of oscillations of a troublesome mode. By next changing the effective diameter of the resonator its performance may be shifted so as to cause it to pass over the frequency of the unwanted oscillation to a point on the new graph which is also the same as the intermediate frequency. Thereafter tuning may proceed free from interference by the oscillations of the unwanted mode up to some point at which oscillations of another mode become troublesome.

An expedient which may be used for quickly changing the effective diameter and with it the ratio of diameter to length of a cylindrical resonator comprises providing the resonator with a longitudinally tapered cylindrical shell and separately supported end plates. After tuning in the usual manner by moving one of the end plates has proceeded over a first band to a frequency adjacent that of oscillations of the troublesome interfering mode, tuning is discontinued and the tapered cylinder is moved longitudinally with respect to the end plates so that the resonator changes its effective average diameter thus hopping past the interfering mode. Tuning may again begin using a new scale to sweep over a second band contiguous to the first band.

In the drawing

Fig. 1 shows a chart of certain graphs portraying some resonances of a cavity resonator of cylindrical conformation;

Fig. 2 is a schematic diagram partly in section of a cavity resonator embodying the present invention;

Fig. 3 is a section of the cavity resonator of Fig. 2 looking in the direction of the arrows at the plane 3—3, and Fig. 4 is a section of the fixed end plate taken along the line 4—4 of Fig. 3.

Equation 3 presents the relationship between the quantities $(fD)^2$ and $$\left[\frac{D}{L}\right]^2$$

Graphs may be plotted for each mode of oscillation occurring within a particular range such as $TE_{0,1,17}$, $TE_{3,2,6}$ and $TE_{6,1,9}$, etc. Thus we may construct a chart such as that of Fig. 1 in which the ordinates are indicated as the square of the quantity $fD$ and abscissae as the square of the ratio of diameter D of the cylindrical resonator to its length L in accordance with the relationship presented in Equation 3. The magnitudes of the ordinates $(fD)^2$ are indicated in arbitrary units which include the proportionality constants and the abscissae $$\left[\frac{D}{L}\right]^2$$

show numerical values. For any given diameter D as, for example, 3.37 inches a scale of frequency ordinates $f_{1-2}$ may also be plotted as indicated. It must be remembered, however, that unlike the fixed ordinates $(fD)^2$ the ordinates of the $f_{1-2}$ scale are not applicable to all cylindrical structures but only to the special case of D=3.37 inches and that for some smaller diameter, for example, D=3.363 inches a still different frequency scale of ordinates such as $f_{4-5}$ must be used. Likewise in the case of the abscissae the scale of $$\left[\frac{D}{L}\right]^2$$

is applicable generally to all cylindrical structures. It is possible, however, to plot resonator length scales based on assumed diameters and this has been done, the length $L_{1-2}$ scale indicating the length of the resonator in inches when used in conjunction with the $f_{1-2}$ scale for a structure having a fixed diameter of 3.37 inches and the $L_{4-5}$ scale serving similarly for the range of $f_{4-5}$ frequencies for a fixed diameter of 3.363 inches.

Suppose that we wish to use oscillations of $TE_{0,1,17}$ mode and that we desire to tune over a band of frequencies beginning with an upper frequency of 9463 megacycles and that the cylindrical resonator has a diameter of 3.37 inches. The conditions are those of the point $P_1$ on the $TE_{0,1,17}$ graph. The length L of the resonator or the distance between its end plates obtainable from the $L_{1-2}$ scale is 11.88 inches. If, now, we begin the tuning operation by causing the movable end plate of the resonator to be shifted in a direction away from the fixed end plate, the length of the resonator increases and the frequency falls. We may carry this operation throughout an interference-free band to some frequency such as 9420 megacycles at the intermediate frequency point $P_2$ which corresponds to a length on the $L_{1-2}$ scale of 11.945 inches. Had we carried the tuning operation farther to 9413 megacycles at point $P_3$ interference would have been encountered from the $TE_{3,2,6}$ mode, the graph of which intersects $TE_{0,1,17}$ at point $P_3$. The next step after reaching the point $P_2$ is to discontinue tuning and to decrease diameter of the resonator to 3.363 inches. This reduction of 7 mils in diameter, as has already been explained, shifts the magnitudes of the frequency and length scales since it changes the ratio of D to L upon which the frequency depends. Accordingly, the frequencies of all the points which we have been considering on the graph of Fig. 1 are increased. For example, the point $P_2$ now corresponds to a length 11.948 inches and now occurs at 9440 megacycles as ascertained from the ordinate scale $f_{4-5}$. The mode crossing or interference point $P_3$ is at 9433 megacycles. It will be recalled that we had stopped the tuning operation at 9420 megacycles. In order to resume tuning at that frequency, we first slightly readjust our tuner by suitable adjustments of the position of the movable tuning piston to the point $P_4$ which, at a length 11.953 inches, corresponds to the frequency 9420 on the $f_{4-5}$ scale. By this operation of changing essentially only the tube diameter we have hopped over the interfering point $P_3$ without having to use that point in tuning. From a frequency of 9420 megacycles at point $P_4$ we continue the tuning operation to the 9373 megacycle point $P_5$ by increasing the length L to 12.063 inches, which is essentially the same length we would have used (12.058) had we not changed tube diameter.

It will be clear that the invention provides a technique enabling the interference-free tunable range of a cavity resonator for a given mode of oscillations to be greatly augmented provided we are able to change the diameter of the cavity resonator so as to hop over a mode intersection point.

One embodiment of a means for effecting change in diameter of a tunable resonator is shown in Fig. 2. Instead of a sudden transition from one diameter to another it relies upon the change in the average effective diameter which is obtained if the cylindrical shell is made appreciably longer than its used portion and is slightly tapered or conical so that its internal diameter increases from $D_0$ at its smaller end to $D_0+\Delta D_0$ at the larger end. Such a tapered cylindrical plates 21 and 22, the structure being mounted on a base member 23. Input and output coaxial circuits extend to narrow slot apertures 26 in the fixed plate 22 and terminate in energy transfer loops 24 and 25 which extend into the internal electromagnetic field of the resonator 20 in planes tangential to the circularly directed electric field vectors. The planes of these loops lie at approximately midpoints between the center and the peripheral boundary of the resonator chamber at which positions the circularly directed electric vectors are of substantially maximum intensity for oscillations of $TE_0$ modes. The other end 21 of the resonator is supported by a toothed rack member 27 slidably mounted on the base 23 in a track 28 which holds the movable tuning piston 21 with its center aligned with the longitudinal axis of the resonator shell 20. In order to move the piston 21 in a direction along the axis of the resonator a shaft 29 mounted in bearings on the base 23 and carrying the toothed pinion 30 engaging with the teeth of the rack member 27 is provided. The shaft 29 may be provided with any known hand operating mechanism, not shown. This permits the position of the piston 21 to be adjusted inwardly or outwardly as desired. In like manner the tapered cylindrical shell 20 is mounted on a rack member 32 for movement in a longitudinal direction along the track 28. Movement of the resonator 20 is effected by means of a knob (not shown) attached to the shaft 33 which is mounted on the base plate 23 and carries a toothed pinion 34 engaging the teeth of rack 32.

The piston 21 and the fixed end plate 22 determine the length L of the resonator space which is measured by their separation. The diameter of the shell 20 is, as has been stated, slightly tapered. It may increase, for example, by an amount of 2 mils for each inch in longitudinal direction so that the difference in diameters of the end of the 12-inch tube may amount to 24 mils. The tapered cylinder may be a slightly tapered aluminum tube silver plated in the usual manner. It may also be a cylindrical tube having an inner silver plating which is varied in thickness from one end of the tube to the other to constitute a tapered bore. Among other suitable alternatives is a glass tube with a tapered bore and an interior plating or coating of electrically conductive substance.

In operation of the apparatus of Fig. 2 in accordance with the method which has been outlined in connection with Fig. 1, the tube 20 may be shifted to the left to a position such that its average effective diameter is 3.37 inches. In order to accomplish this with considerable precision the resonator 20 may carry a spring detent 36 cooperating with notches 37 in a retainer fixedly attached to the stationary track 28. At the beginning of the tuning operation the tuning piston 21 may occupy a position in which it is nearest to the fixed end plate 22. Tuning may proceed by operation of the shaft 29 to move the piston 21 to the left, the frequencies being indicated by an indicator pointer 38 moving in a direction to the left over the right-hand scale 39. When the intermediate frequency point P₂ is reached and it becomes desirable to reduce the diameter the resonator 20 may be moved to the right thus reducing the effective diameter of the cylindrical chamber between piston 21 and end plate 22 to a predetermined magnitude which may correspond to the position the detent 36 may occupy. The piston 21 may now be reset to such a point that the pointer 38 indicates the same intermediate frequency on the scale 40 as it had previously indicated on the scale 39. Thereafter tuning may continue by moving the piston 21 to the left.

It will be evident that this same procedure may be applied to avoid other mode crossings if it be desired to extend the range of the continuous tuning band for which the resonator may be free of interfering modes. For this purpose it will be necessary to increase the length of the resonator shell 20 so that its diameter may be changed by additional steps by shifting the shell longitudinally. For these additional ranges scales 41 and 42 may be provided.

The fixed end plate 22 and the piston as well may consist of plates of dielectric material 43 with metallic front plates 44 and back plates 45 to provide against warping and to present a highly electrically conductive surface as a boundary of the electromagnetic field. The peripheral gaps separating the end plate 22 and the piston 21 from the shell 20 enhance the discrimination which the resonator exhibits in favor of oscillations of TE₀ mode and against those of modes involving radially directed electric vectors.

What is claimed is

1. A cavity resonator comprising a conducting surface in the form of a tube having varying internal cross-sectional area, parallel end walls defining the boundaries of an electromagnetic field within the tube, means for moving one of the end walls with reference to the other to vary the tuning of the resonator over a band of frequencies and means for moving the tubular conducting surface longitudinally relatively to the position of the end walls.

2. A cavity resonator comprising a conducting surface in the form of a frustum of a cone, parallel end walls defining the boundaries of an electromagnetic field therewithin, means for moving one of the end walls with reference to the other to vary the tuning of the resonator over a band of frequencies, means for moving the conical conducting surface longitudinally relatively to the position of the end walls and means for exciting oscillations of TE₀ mode within said resonator.

3. A cavity resonator comprising a conducting surface in the form of a frustum of a cone, parallel end walls defining the boundaries of an electromagnetic field therewithin, means for moving one of the end walls with reference to the other to vary the tuning of the resonator over a band of frequencies, means for moving the conical conducting surface longitudinally relatively to the position of the end walls, means for exciting oscillations of TE₀ mode within said resonator, and a series of external scales so calibrated as jointly to enable a continuous tuning over contiguous bands without interference from an extraneous mode lying just outside one of said bands in the region of the other.

WALTER F. KANNENBERG.

REFERENCES CITED

The following references are of record in the file of this patent:

UNITED STATES PATENTS

| Number | Name | Date |
|---|---|---|
| 2,281,550 | Barrow | May 5, 1942 |
| 2,315,313 | Bucholz | Mar. 30, 1943 |
| 2,405,277 | Thompson | Aug. 6, 1946 |